United States Patent [19]

Fanning et al.

[11] Patent Number: 5,019,327
[45] Date of Patent: May 28, 1991

[54] FUEL ASSEMBLY TRANSFER BASKET FOR POOL TYPE NUCLEAR REACTOR VESSELS

[75] Inventors: Alan W. Fanning; Nicholas L. Ramsour, both of San Jose, Calif.

[73] Assignee: General Electric Company, San Jose, Calif.

[21] Appl. No.: 469,984

[22] Filed: Jan. 25, 1990

[51] Int. Cl.⁵ .............................................. G21C 19/10
[52] U.S. Cl. ...................................... 376/268; 376/269
[58] Field of Search ............... 376/269, 270, 268, 271, 376/264, 272; 294/906

[56] References Cited

U.S. PATENT DOCUMENTS

| H63 | 5/1986 | Vogel et al. | 376/260 |
|---|---|---|---|
| 2,998,368 | 8/1961 | Long | 376/264 |
| 3,253,995 | 5/1966 | Antonsen et al. | 376/271 |
| 4,024,018 | 5/1977 | Barnes | 376/269 |

FOREIGN PATENT DOCUMENTS

| 1464934 | 5/1972 | Fed. Rep. of Germany | 376/271 |
|---|---|---|---|
| 60-58438 | 12/1985 | Japan | 376/272 |

Primary Examiner—Daniel D. Wasil
Attorney, Agent, or Firm—Robert R. Schroeder

[57] ABSTRACT

A fuel assembly transfer basket for a pool type, liquid metal cooled nuclear reactor having a side access loading and unloading port for receiving and relinquishing fuel assemblies during transfer.

10 Claims, 2 Drawing Sheets

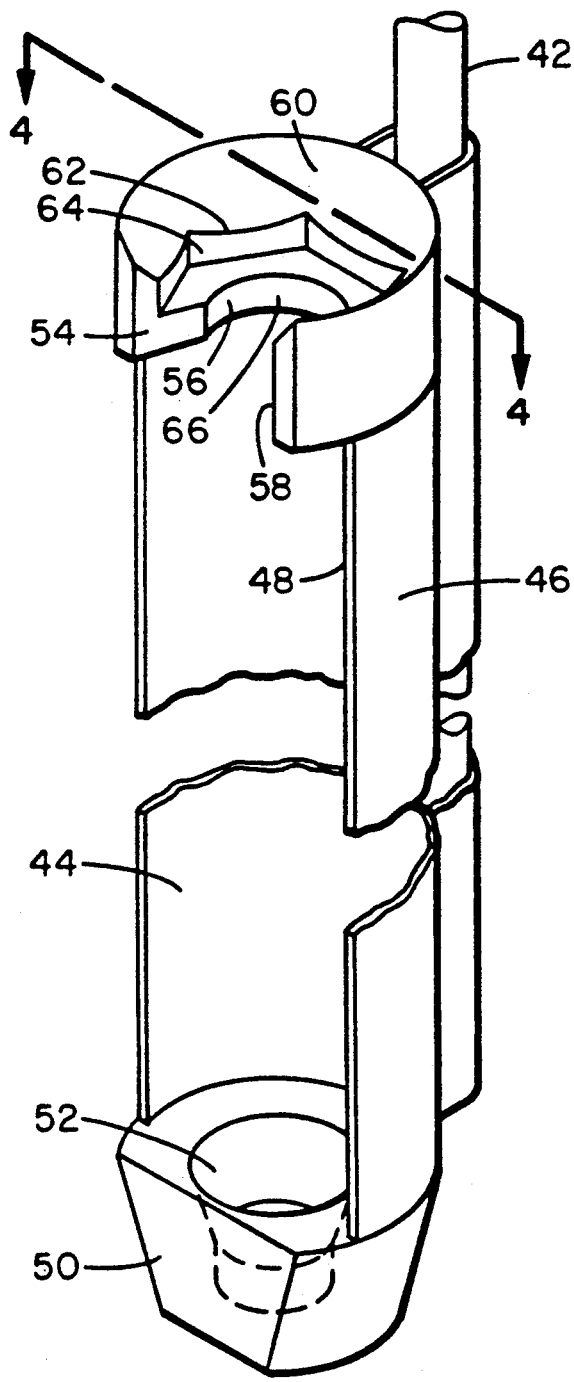
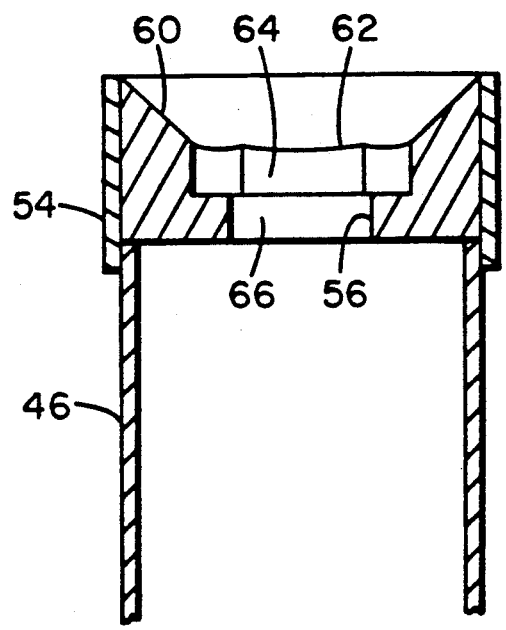
FIG. 3
FIG. 4

FUEL ASSEMBLY TRANSFER BASKET FOR POOL TYPE NUCLEAR REACTOR VESSELS

The U.S. Government has rights in this invention under Contract No. DE-AC03-88SF174467.

FIELD OF THE INVENTION

This invention relates to fuel assembly transfer baskets for pool type nuclear reactors. The invention is specifically directed to an improved assembly transfer basket for transferring fuel assemblies within the vessel of a pool type, liquid metal cooled nuclear reactor.

BACKGROUND OF THE INVENTION

Pool type, liquid metal cooled nuclear fission reactors typically comprise a vertically positioned tank or vessel having an open upper end provided with a cover member closing off the opening in the upper end. The reactor vessel, which has no components penetrating through its wall structure, contains a core of fissionable nuclear fuel conventionally positioned centrally and adjacent to the lower end of the reactor vessel or tank. The fuel core of fissionable material is submerged within a pool of liquid metal coolant, such as sodium, which substantially fills the reactor vessel to a level sufficient to submerge the fuel units both within the core and handled at a level above the fuel core. Liquid metal coolant is circulated through the fuel core to remove fission produced heat from the core and transfer the heat removed from the core to a heat exchanger for conveyance and use outside of the reactor vessel by means of a fluid pumping system. Operating means comprising fission control rods are suspended down from the reactor vessel top member for reciprocal movement into and out from the fuel core.

Typically the area or plenum within the reactor vessel above the surface of the pool of liquid metal is filled with an inert gas such as nitrogen or argon to preclude reactive material from contacting the coolant.

Heat generating, fissionable fuel comprising uranium, plutonium and/or thorium metal, or alloys thereof, in the form of small pellets or slugs, is sealed within metal, such as stainless steel, tubes or elongated containers. A plurality of such fuel containing tubes are combined into a single unit or assembly. Typically these reactor fuel core assemblies are of hexagonal or similar angular cross sections, and their lower end is provided with a conical end member to facilitate seating in a bottom support structure. The upper end of the reactor fuel core assembles is provided with a top member having a cylindrical portion of substantially smaller diameter than the assembled body of joined fuel tubes which projects axially upward from the assembly, and an end cap thereon comprising a transverse annular flange of hexagonal or similar multi angular cross section. This configuration of the top member, which resembles the head end of a lag bolt, provides for vertical aligning of the fuel assembly in both core and storage mounting brackets or supports.

An in-vessel transfer device extends down from a circular revolving section of the reactor vessel cover member whereby it can move over a substantial cross-sectional area of the central portion of the reactor vessel including the fuel core. The in-vessel transfer device serves to introduce and remove fissionable fuel in the form of the typical assembled bodies into and out from the reactor vessel, and within and about the reactor vessel including to and from the fuel core and internal reactor vessel storage means such as racks. In-vessel transfer devices conventionally comprise a vertical support structure which extends through the sealing reactor vessel top member whereby it can be manipulated by an operator from above the reactor vessel. The vertical support structure is provided with a gripping mechanism for securely attaching to and holding assembled fuel bodies whereby they can be safely and effectively moved about within the reactor vessel remotely by an operator located a distance above the reactor vessel.

A conventional type of gripping mechanism mounted on the vertical support structure as a means for extending the operating scope or reach and maneuverability is a device having a panographic action or system. Such a means reciprocally mounted on the vertical support structure provides significantly extended vertical and lateral maneuverability and grasping action for fuel assemblies within the reactor vessel by an externally located operator from a distance above the reactor vessel.

Although various grasping systems can be employed for attaching to the fuel assemblies, a preferred means comprises a socket type of union which minimizes the potential for causing damage to the fuel assemblies. A common and suitable socket union for securing fuel assemblies consists of a socket cavity in the uppermost end of the fuel assembly units and a counterpart mating socket extension having retractable lateral projections affixed to the gripping mechanism. Thus, the socket extension can vertically enter down into a mating socket cavity of a fuel assembly with the lateral projections retracted, and upon extension of the lateral projections of the socket while mated within the socket cavity into lateral counterpart receiving recesses, the gripping mechanism will be effectively locked to the fuel assembly for secure transfer within the vessel.

A transfer basket or receptacle is conventionally employed with the in-vessel transfer device for the conveyance of fuel core assemblies into and out from the reactor vessel of such pool type, liquid metal cooled nuclear reactors. The typical transfer basket comprises an open top container or receptacle suspended from a support member extending down through the reactor vessel top member and into the vessel interior. The basket member generally consists of an elongated container or receptacle of a size adequate to accept at least one fuel core assembly through an open upper end or top and essentially enclose the assembly within its internal cavity whereby the fuel core assemblies can be effectively retained and securely moved or transferred into and out from the reactor vessel without the possibility of accidental disgorgement.

However, the conventional transfer baskets being top loading, the in-vessel transfer device in handling the elongated fuel core assemblies between the fuel core or in-vessel storage racks, must exercise extensive vertical movement in raising the fuel assemblies up above the transfer basket for their introduction or withdrawal through top openings of the transfer baskets.

SUMMARY OF THE INVENTION

This invention comprises an improved fuel assembly transfer basket for fuel assembly conveyance into and out from the reactor vessel of a pool type of a nuclear reactor. The improved fuel assembly transfer basket of this invention comprises a novel construction enabling lateral loading and unloading of the basket with fuel assemblies through a side access port.

OBJECTS OF THE INVENTION

It is a primary object of this invention to provide an improved transfer basket for nuclear reactor fuel assemblies.

It is an additional object of this invention to provide a side loading and unloading nuclear reactor fuel assembly transfer basket for fuel transfer within a pool type nuclear reactor system.

It is a further object of this invention to provide an improved fuel assembly transfer basket for nuclear reactor service that securely supports and grasps fuel assembly units with both vertical and horizontal support means.

It is a still further object of this invention to provide an improved fuel assembly transfer basket that enables a reduction in the vertical movement or length of travel of an in-vessel transfer device for loading or unloading fuel assemblies into or out from the transfer basket.

It is also an object of this invention to provide an improved fuel assembly transfer basket for conveying fuel assemblies into and out from the reactor vessel of pool type, liquid metal cooled nuclear rectors having a side opening for lateral loading or unloading.

BRIEF DESCRIPTION OF THE DRAWINGS

FIG. 3 comprises a perspective view of a fuel assembly transfer basket of this invention.

FIG. 4 comprises a cross-sectional view of the fuel assembly transfer basket of FIG. 3, along lines 4—4.

DETAILED DESCRIPTION OF THE INVENTION

Figures 1, 2:
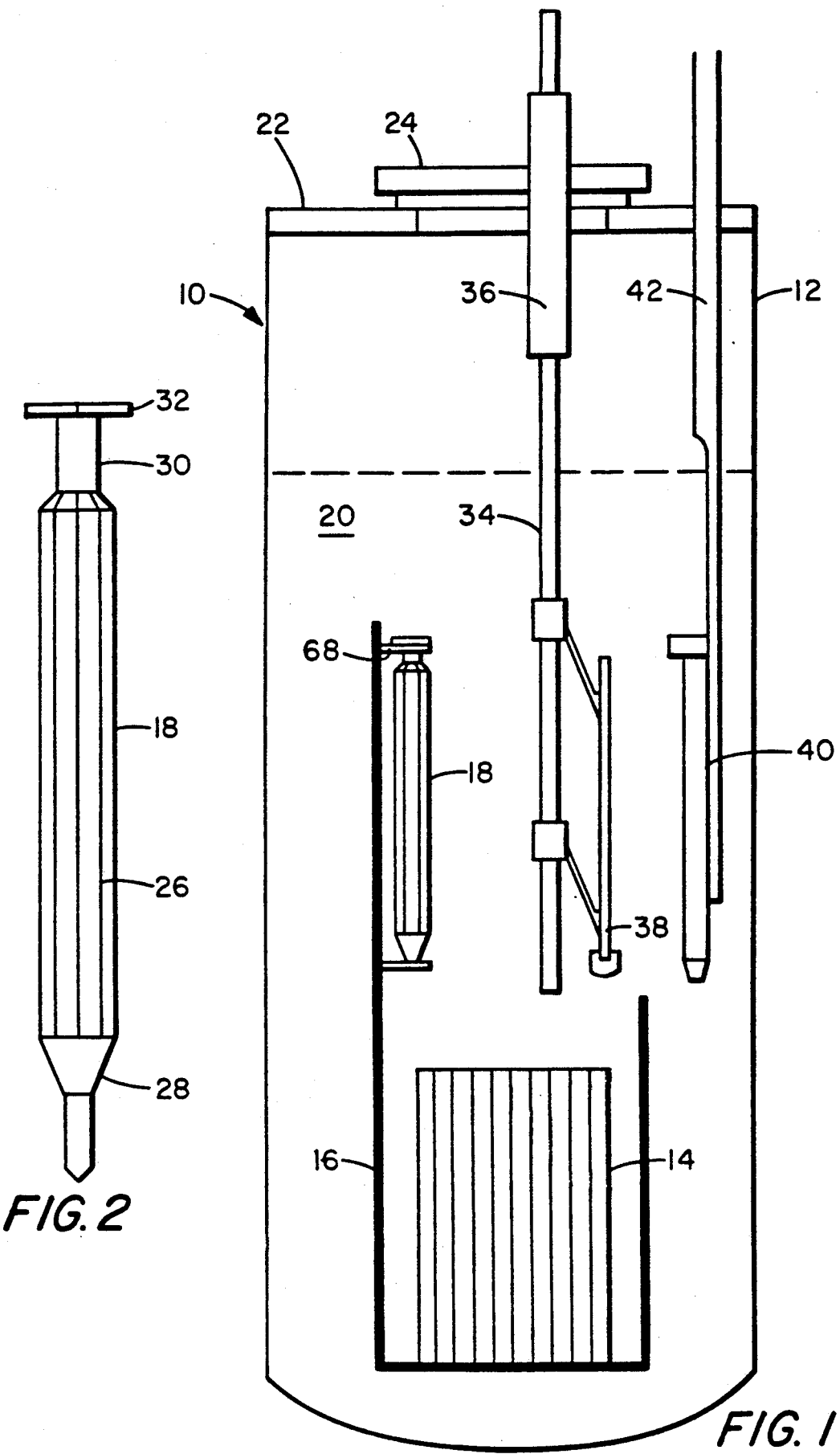
FIG. 1 comprises a schematic illustration of a cross-section of a liquid metal cooled, pool type nuclear reactor plant.
FIG. 2 comprises a perspective view of a nuclear reactor fuel assembly for a liquid metal cooled, pool type nuclear reactor.

Referring to the drawing, FIG. 1 in particular, a typical liquid metal cooled, pool type nuclear reactor plant 10, comprises a reactor vessel 12 having an open top and side and bottom walls without any penetrations passing therethrough. A fuel core 14 containing heat producing fissionable fuel comprising oxides of uranium, plutonium and/or thorium, is located in the lower portion of vessel 12, supported on a fuel core support structure 16. The fissionable fuel material of the core is enclosed within sealed tubes which are grouped and assembled into units or fuel assemblies 18.

A liquid metal coolant 20, such as sodium metal, substantially fills the reactor vessel 12, forming the coolant pool with the fuel core 14 submerged therein. The liquid metal coolant is circulated by means of a pump (not shown) through a circuit including the heat generating fuel core 14 and a heat exchanger (not shown) to transfer the heat from the core to a means for its consumption such as steam turbine generators (not shown).

The reactor vessel 12 is provided with a cover member 22 to close the vessel and to contain and isolate its contents including the fissionable fuel material and radioactive fission products along with the liquid metal coolant 20 from the outside atmosphere. The cover member 22 includes both at least one access opening for the introduction or removal of fuel units and maintenance tools, and at least one revolving section 24 to enable greater versatility and maneuverability for implements passing therethrough for operations within the reactor vessel.

A gaseous blanket of an inert gas such as nitrogen or argon is provided over the pool of liquid metal coolant forming a gaseous barrier precluding contact of the coolant with the external atmosphere and foreign matter and in turn its contamination or any deleterious reactions.

As illustrated in FIG. 2 of the drawing, a conventional type of fuel assembly 18 for liquid metal cooled, pool nuclear reactors, comprises a multiplicity of sealed tubes containing fuel which are grouped into an assembly having an angular cross-section 26 such as hexagonal. The lower end of the fuel assembly 18 is provided with a generally conical portion and projection 28 to facilitate mounting into openings of a support structure. The upper end of the fuel assembly comprises a cylindrical intermediate portion 30 of relatively reduced diameter and an uppermost end portion comprising a transverse annular flange 32 of an angular cross-section such as hexagonal. The upper end structure of the fuel assemble facilitates both securing and aligning the unit in either the fuel core or storage racks.

A typical in-vessel transfer device 34 for moving fuel assemblies 18 within the vessel of a liquid metal cooled, pool nuclear reactor comprises a vertical support structure 36 or shaft which penetrates down through the vessel cover member 22 into vessel 12, and is provided with a gripping mechanism 38 at its lower portion within the vessel for securely grasping and holding a fuel assembly 18 for transfer. The vertical support structure 36 normally extends through a rotatable section of cover number 22 whereby an operator from above the reactor vessel 12 can manipulate the gripping mechanism 38 within the vessel 12 over a broad area including the fuel core. In a preferred arrangement the gripping mechanism 38 is mounted on a pantographic type system which is mounted on the vertical support structure 36 whereby it provides greater flexibility in its capacity to reach or extend over the area above the fuel core.

In accordance with this invention, a fuel assembly transfer device 40, suspended on a support member 42 passing through a port in the reactor vessel cover 22, comprises a basket unit 44 having an intermediate body section 46 provided by a hollow cylinder or other encircling housing. Cylindrical housing 46 is provided with an elongated side access port 48 of an apt configuration and area for passing therethrough of a fuel assembly 18. The transfer basket 44 comprises a lower end annular base member 50 having a conical shaped central opening 52 for receiving and securely seating the conical portion 28 and projection of a conventional fuel assembly 18. An upper end of the transfer basket 44 also comprises a semicircular cap member 54 having a central opening 56 extending vertically therethrough and with the gap 58 of the semicircular cap member 54 aligned with and corresponding to the side access port 48 of the intermediate body section 46.

The central opening 56 extending vertically through upper end semicircular cap member 54 is provided with an upper semi-annular downward sloping surface 60 directed towards the central opening 56, and an adjoining intermediate portion 62 having an angular peripheral edge 64 or vertical wall portion surrounding the central opening 56. Adjoining the lower side of the intermediate portion 62 is a semicircular portion 66 of relatively reduced diameter.

In a preferred embodiment of this invention the basket unit 4 of the transfer device 40 is suspended and vertically moved by a support member 42 comprising an extendable tape such as a bi-stem drive tape which extends down through a port in the reactor cover member 24.

With this arrangement of the transfer basket 44, a fuel assembly unit 18 can be securely mounted and carried within the side loading basket 44 for transfer. This is effected by means of laterally introducing the conical portion 28 and projection of the fuel assembly into the conical shaped central opening 52 of the annular base member 50, and the upper annular flange 32 of the fuel assembly into the sloping downward central opening 56 and dropping down into and seating into the adjoining intermediate portion 62.

New fuel assemblies 18 for refueling the reactor fuel core 14 are introduced into the reactor vessel 12 passing through a port in the vessel cover member 22 while retained and carried within the transfer basket 44. Then the in-vessel transfer device 34 takes the fuel assembly 18 from the transfer basket 44 within the vessel and either places it within the fuel core 14, or positions it in a storage rack 68 such as shown mounted on the fuel core support structure 16 for temporary keeping. The reverse procedure is employed for removing spent fuel assemblies 18 from the fuel core 14, and their disposal from the reactor vessel 12.

As is apparent, the transfer of a fuel assembly to the novel side loading transfer basket 44 of this invention significantly reduces the distance of vertical travel for the in-vessel transfer device 34 in handling and manipulating a fuel assembly. This decreases the travel distance of the in-vessel transfer device and reduces the costly path time required for a refueling outage a significant amount. Moreover, the side loading transfer basket reduces the in-vessel transfer device duty cycles which provides a substantial improvement in the device's reliability and service life.

Also, the consequences of mishandling and dropping a fuel assembly due to a malfunction of the in-vessel transfer device are minimized with the side loading transfer basket of the invention because of the substantially shorter falling distance of any dropped fuel assemblies. And in the event of an in-vessel transfer device drive failure while transferring a fuel assembly, the side loading transfer basket of this invention can assist in recovering a fuel assembly by being raised or lowered to any elevation corresponding to an immobilized fuel assembly whereby the fuel assembly can be transferred from the in-vessel transfer device to the side loading transfer basket utilizing normal procedures.

What is claimed is:

1. A nuclear reactor fuel assembly transfer basket with a side access loading and unloading port for fuel assembly transfer service within a pool type nuclear reactor, comprising:
   a generally vertically positioned hollow cylindrical body affixed to a depending support means and having an elongated side access port extending substantially the length of the cylindrical body,
   said generally vertically positioned cylindrical body having a lower end annular base member with a conical shaped central opening extending vertically therethrough, and an upper end semicircular cap member having a central opening extending vertically therethrough with an upper annular surface sloping downward towards the central opening with an adjoining intermediate portion having an angular peripheral edge partially surrounding the central opening and an adjoining lower semicircular portion.

2. The nuclear reactor fuel assembly transfer basket of claim 1, wherein the conical shaped central opening extending vertically though the lower end annular base member slopes inward and downward.

3. The nuclear reactor fuel assembly transfer basket of claim 1, wherein the intermediate portion of the upper end semicircular cap member comprises a flat horizontal semiannular plane area extending partially around the central opening and a peripheral vertical edge of a partial hexagonal cross-section.

4. The nuclear reactor fuel assembly transfer basket of claim 1, wherein the central openings extending vertically through the lower end annular base member and the upper end semicircular cap member of the hollow cylindrical body are aligned and concentric with the central axis of the hollow cylindrical body.

5. A nuclear reactor fuel assembly transfer basket with a side access loading and unloading port for fuel assembly transfer service within a pool type nuclear reactor, comprising:
   a generally vertically positioned hollow cylindrical body affixed to a manipulable depending support means and having an elongated side access port extending the length of the cylindrical body,
   said generally vertically positioned cylindrical body having a lower end annular base member with a conical shaped central opening concentric with the central axis of the cylindrical body extending vertically therethrough, and an upper end semicircular cap member having a central opening concentric with the central axis of the cylindrical body extending vertically therethrough with an upper annular surface sloping downward towards the central opening with an adjoining intermediate portion having an angular peripheral edge partially surrounding the central opening and an adjoining lower semicircular portion.

6. The nuclear reactor fuel assembly transfer basket of claim 5, wherein the conical shaped central opening extending vertically through the lower end annular base member slopes inward in the downward direction.

7. The nuclear reactor fuel assembly transfer basket of claim 5, wherein the intermediate portion of the upper end semicircular cap member comprises a flat horizontal semicircular plane area extending partially around the central opening in the cap member with a peripheral vertical edge extending upward from said plane area of a partial hexagonal cross-section.

8. The nuclear reactor fuel assembly transfer basket of claim 5, wherein the manipulable depending support means having the generally vertically positioned hollow cylindrical body affixed thereto is moveable in vertical directions.

9. The nuclear reactor fuel assembly transfer basket of claim 5, wherein the manipulable depending support means having the generally vertically positioned hollow cylindrical body affixed thereto is a metal tape.

10. A nuclear reactor fuel assembly transfer basket with a side access loading and unloading port for fuel assembly transfer service within a pool type nuclear reactor vessel, comprising:

a generally vertically positioned hollow cylindrical body affixed to a manipulative depending support means movable in vertical directions and having an elongated side access port extending the length of the cylindrical body, said generally vertically positioned cylindrical body having a lower end annular base member with a conical shaped central opening concentric with the central axis of the cylindrical body extending vertically therethrough and sloping inward in the downward direction, and an upper end semicircular cap member having a central opening concentric with the central axis of the cylindrical body extending vertically therethrough with an upper annular surface sloping downward and inward towards the central opening and an adjoining intermediate portion comprising a flat horizontal semicircular plane area extending partially around the central opening and having a peripheral vertical edge extending upward from said plane are of a partial hexagonal cross-section and an adjoining lower semicircular portion.

* * * * *